United States Patent
DeMont et al.

(10) Patent No.: US 10,111,385 B2
(45) Date of Patent: Oct. 30, 2018

(54) NUT HARVESTER WITH SEPARATING DISKS

(71) Applicant: Jackrabbit, Ripon, CA (US)

(72) Inventors: Robert DeMont, Ripon, CA (US); Thomas Rumble, Ripon, CA (US)

(73) Assignee: Jackrabbit, Ripon, CA (US)

( * ) Notice: Subject to any disclaimer, the term of this patent is extended or adjusted under 35 U.S.C. 154(b) by 1 day.

(21) Appl. No.: 15/192,279

(22) Filed: Jun. 24, 2016

(65) Prior Publication Data
US 2017/0367263 A1  Dec. 28, 2017

(51) Int. Cl.
| | | |
|---|---|---|
| *A01D 51/00* | (2006.01) | |
| *A01D 17/06* | (2006.01) | |
| *A01D 33/08* | (2006.01) | |
| *B07B 1/14* | (2006.01) | |
| *B07B 1/15* | (2006.01) | |
| *B07B 1/46* | (2006.01) | |
| *A01D 33/02* | (2006.01) | |

(52) U.S. Cl.
CPC ........... *A01D 51/002* (2013.01); *A01D 17/06* (2013.01); *A01D 33/02* (2013.01); *A01D 33/08* (2013.01); *B07B 1/14* (2013.01); *B07B 1/15* (2013.01); *B07B 1/46* (2013.01)

(58) Field of Classification Search
CPC ........ A01D 29/00; A01D 33/02; A01D 33/04; A01D 33/08; A01D 45/006; A01D 45/008; A01D 45/22; A01D 51/00; A01D 51/002; B07B 1/14; B07B 1/15
See application file for complete search history.

(56) References Cited

U.S. PATENT DOCUMENTS

| | | |
|---|---|---|
| 530,262 A | 12/1894 | Distl et al. |
| 622,035 A | 3/1899 | Bray |
| 785,508 A | 3/1905 | Mason |
| 800,690 A | 10/1905 | Stuart et al. |
| 1,012,046 A | 12/1911 | Anderson |
| 1,014,493 A | 1/1912 | Lauritzen et al. |
| 1,418,899 A | 6/1922 | Acken |
| 1,524,360 A | 1/1925 | Lauritzen |
| 1,641,777 A | 9/1927 | Newhouse |
| 1,647,816 A | 11/1927 | Riddell |
| 1,677,838 A | 7/1928 | Molin |
| 1,679,593 A | 8/1928 | Williamson et al. |
| 1,699,718 A | 1/1929 | Robins |
| 1,899,292 A | 2/1933 | Rienks |
| 1,899,737 A | 2/1933 | Ulrich |

(Continued)

FOREIGN PATENT DOCUMENTS

| | | |
|---|---|---|
| AU | 646931 B2 | 10/1992 |
| AU | 671168 B2 | 9/1994 |

(Continued)

*Primary Examiner* — Alicia Torres
(74) *Attorney, Agent, or Firm* — Blank Rome LLP

(57) ABSTRACT

Systems and methods for separating harvested crop product from twigs, dirt, dust, and other debris. A disk to be used in a harvester includes a first segment and a second segment and is configured to cooperate with adjacent disks axially mounted on a common rotational shaft, and radially cooperate with disks mounted on a parallel rotational shaft. The disks are used in a roller assembly or a harvester, and gaps between cooperating disks remain effectively constant during operation.

15 Claims, 10 Drawing Sheets

(56) References Cited

U.S. PATENT DOCUMENTS

| | | | |
|---|---|---|---|
| 1,941,147 A | 12/1933 | Johlige | |
| 2,055,630 A | 9/1936 | McLean | |
| 2,124,856 A | 7/1938 | Kohler | |
| 2,244,546 A | 6/1941 | Stockdale | |
| 2,257,352 A | 9/1941 | Silver | |
| 2,266,506 A | 12/1941 | Morse | |
| 2,350,332 A | 6/1944 | Albaugh, Sr. | |
| 2,357,892 A | 9/1944 | Grant | |
| 2,370,539 A | 2/1945 | Hodecker | |
| 2,417,921 A | 3/1947 | Fox | |
| 2,477,006 A | 7/1949 | Pierson | |
| 2,565,559 A | 8/1951 | Hurdelbrink | |
| 2,588,309 A | 3/1952 | Troyer | |
| 2,604,206 A | 7/1952 | Armer | |
| 2,618,385 A | 11/1952 | Silver et al. | |
| 2,624,458 A | 1/1953 | Molnau | |
| 2,632,290 A | 3/1953 | Anderson | |
| 2,670,846 A | 3/1954 | Rienks et al. | |
| 2,699,253 A | 1/1955 | Miller | |
| 2,743,813 A | 5/1956 | Erickson | |
| 2,786,574 A | 3/1957 | Clark | |
| 2,830,703 A | 4/1958 | Laase | |
| 2,915,180 A | 12/1959 | MacGillivray | |
| 2,949,189 A | 8/1960 | Haines | |
| 2,966,267 A | 12/1960 | Dunbar | |
| 2,974,793 A | 3/1961 | Kuntz | |
| 2,976,550 A | 3/1961 | Silver et al. | |
| 3,010,522 A | 11/1961 | Oppel | |
| 3,217,346 A | 11/1965 | Silver et al. | |
| 3,265,206 A | 8/1966 | Allen | |
| 3,267,502 A | 8/1966 | Wells | |
| 3,306,441 A | 2/1967 | Sanders et al. | |
| 3,353,947 A | 11/1967 | Kramer | |
| 3,367,494 A | 2/1968 | Peterson | |
| 3,451,084 A | 6/1969 | Silver | |
| 3,473,615 A * | 10/1969 | Harrell | A01D 29/00 171/116 |
| 3,738,483 A | 6/1973 | MacKenzie | |
| 3,747,149 A | 7/1973 | Tatyanko et al. | |
| 3,750,211 A | 8/1973 | Zaun et al. | |
| 3,757,946 A | 9/1973 | Berkowitz et al. | |
| 3,817,375 A | 6/1974 | Herkes | |
| 3,848,741 A | 11/1974 | Haley et al. | |
| 3,870,627 A | 3/1975 | Herkes | |
| 3,985,233 A | 10/1976 | Sherman | |
| 4,037,723 A | 7/1977 | Wahl et al. | |
| 4,101,420 A | 7/1978 | Luginbühl | |
| 4,102,502 A | 7/1978 | Vaplon et al. | |
| 4,202,542 A | 5/1980 | Lammers et al. | |
| 4,209,097 A | 6/1980 | Nordmark et al. | |
| 4,239,119 A | 12/1980 | Kroell | |
| 4,264,012 A | 4/1981 | Paradis | |
| 4,266,676 A | 5/1981 | Ruckstuhl et al. | |
| 4,301,930 A | 11/1981 | Smith | |
| 4,376,042 A | 3/1983 | Brown | |
| 4,377,401 A | 3/1983 | Laughlin | |
| 4,377,474 A | 3/1983 | Lindberg | |
| 4,430,210 A | 2/1984 | Tuuha | |
| 4,452,694 A | 6/1984 | Christensen et al. | |
| 4,471,876 A | 9/1984 | Stevenson, Jr. et al. | |
| 4,504,386 A | 3/1985 | Dyrén et al. | |
| 4,538,734 A | 9/1985 | Gill | |
| 4,579,652 A | 4/1986 | Bielagus | |
| 4,600,106 A | 7/1986 | Minardi | |
| 4,606,494 A | 8/1986 | Kroell | |
| 4,633,956 A | 1/1987 | Glifberg et al. | |
| 4,653,648 A | 3/1987 | Bielagus | |
| 4,658,964 A | 4/1987 | Williams | |
| 4,658,965 A | 4/1987 | Smith | |
| 4,703,860 A | 11/1987 | Gobel et al. | |
| 4,741,444 A | 5/1988 | Bielagus | |
| 4,755,286 A | 7/1988 | Bielagus | |
| 4,760,925 A | 8/1988 | Stehle et al. | |
| 4,789,068 A | 12/1988 | Gilmore | |
| 4,795,036 A | 1/1989 | Williams | |
| 4,798,508 A | 1/1989 | Lewis | |
| 4,836,388 A | 6/1989 | Bielagus | |
| 4,844,351 A | 7/1989 | Holloway | |
| 4,853,112 A | 8/1989 | Brown | |
| 4,871,073 A | 10/1989 | Berry et al. | |
| 4,901,863 A | 2/1990 | Lancaster | |
| 4,901,864 A | 2/1990 | Daugherty | |
| 4,903,845 A | 2/1990 | Artiano | |
| 4,915,824 A | 4/1990 | Surtees | |
| 4,946,046 A | 8/1990 | Affleck et al. | |
| 4,972,959 A | 11/1990 | Bielagus | |
| 4,972,960 A | 11/1990 | Bielagus | |
| 5,001,893 A | 3/1991 | Stanley et al. | |
| 5,012,933 A | 5/1991 | Artiano | |
| 5,024,335 A | 6/1991 | Lundell | |
| 5,025,929 A | 6/1991 | Carrera | |
| 5,032,255 A | 7/1991 | Jauncey | |
| 5,037,537 A | 8/1991 | Bielagus | |
| 5,051,172 A | 9/1991 | Gilmore | |
| 5,058,751 A | 10/1991 | Artiano | |
| 5,060,806 A | 10/1991 | Savage | |
| 5,074,992 A | 12/1991 | Clinton | |
| 5,078,274 A | 1/1992 | Brown | |
| 5,108,589 A | 4/1992 | Sherman | |
| 5,116,486 A | 5/1992 | Pederson | |
| 5,152,402 A | 10/1992 | Matula | |
| 5,159,734 A | 11/1992 | Whitt et al. | |
| 5,163,564 A | 11/1992 | Matula | |
| 5,232,097 A | 8/1993 | Tohkala | |
| 5,234,109 A | 8/1993 | Pederson | |
| 5,236,093 A | 8/1993 | Marrs | |
| 5,257,699 A | 11/1993 | Fricker et al. | |
| 5,263,591 A | 11/1993 | Taormina et al. | |
| 5,287,977 A | 2/1994 | Tirschler | |
| 5,298,119 A | 3/1994 | Brown | |
| 5,305,891 A | 4/1994 | Bielagus | |
| 5,344,025 A | 9/1994 | Tyler et al. | |
| 5,361,909 A | 11/1994 | Gemmer | |
| 5,377,848 A | 1/1995 | Jokinen et al. | |
| 5,386,914 A | 2/1995 | Eramaja et al. | |
| 5,395,057 A | 3/1995 | Williams, Jr. et al. | |
| 5,423,430 A | 6/1995 | Zaffiro et al. | |
| 5,425,459 A | 6/1995 | Ellis et al. | |
| 5,450,966 A | 9/1995 | Clark et al. | |
| 5,465,847 A | 11/1995 | Gilmore | |
| 5,480,034 A | 1/1996 | Kobayashi | |
| 5,484,247 A | 1/1996 | Clark et al. | |
| 5,485,925 A | 1/1996 | Miller et al. | |
| 5,493,796 A | 2/1996 | Ballew et al. | |
| 5,503,712 A | 4/1996 | Brown | |
| 5,506,123 A | 4/1996 | Chieffalo et al. | |
| RE35,331 E | 9/1996 | Sherman | |
| 5,555,985 A | 9/1996 | Kobayashi | |
| 5,558,234 A | 9/1996 | Mobley | |
| 5,560,496 A | 10/1996 | Lynn | |
| 5,582,300 A | 12/1996 | Kobayashi | |
| 5,590,792 A | 1/1997 | Kobayashi | |
| 5,626,239 A | 5/1997 | Kobayashi | |
| 5,697,451 A | 12/1997 | Nicholson | |
| 5,733,592 A | 3/1998 | Wettstein et al. | |
| 5,740,922 A | 4/1998 | Williams | |
| 5,799,801 A | 9/1998 | Clark et al. | |
| 5,824,356 A | 10/1998 | Silver et al. | |
| 5,887,515 A | 3/1999 | Kunstmann et al. | |
| 5,887,810 A | 3/1999 | Maruyama | |
| 5,901,856 A | 4/1999 | Brantley, Jr. et al. | |
| 5,913,268 A | 6/1999 | Jackson et al. | |
| 5,957,306 A | 9/1999 | Hoffman | |
| 5,960,964 A | 10/1999 | Austin et al. | |
| 5,967,333 A | 10/1999 | Smith | |
| RE36,537 E | 2/2000 | Sommer, Jr. et al. | |
| 6,053,330 A | 4/2000 | Lavoie | |
| 6,076,684 A | 6/2000 | Bollegraaf | |
| 6,079,929 A | 6/2000 | Muma et al. | |
| 6,110,242 A | 8/2000 | Young | |
| 6,144,004 A | 11/2000 | Doak | |
| 6,149,018 A | 11/2000 | Austin et al. | |
| 6,196,394 B1 | 3/2001 | Sieg et al. | |
| 6,237,778 B1 | 5/2001 | Weston | |

(56) References Cited

U.S. PATENT DOCUMENTS

| | | |
|---|---|---|
| 6,241,100 B1 | 6/2001 | Tanner et al. |
| 6,250,472 B1 | 6/2001 | Grubbs et al. |
| 6,250,477 B1 | 6/2001 | Swanink |
| 6,250,478 B1 | 6/2001 | Davis |
| 6,318,560 B2 | 11/2001 | Davis |
| 6,360,678 B1 | 3/2002 | Komatsu et al. |
| 6,371,305 B1 | 4/2002 | Austin et al. |
| 6,375,565 B1 | 4/2002 | Tanner et al. |
| 6,390,915 B2 | 5/2002 | Brantley et al. |
| 6,460,706 B1 | 10/2002 | Davis |
| 6,648,145 B2 | 11/2003 | Davis et al. |
| 6,702,104 B2 | 3/2004 | Bollegraaf |
| 6,726,028 B2 | 4/2004 | Visscher et al. |
| 6,834,447 B1 | 12/2004 | Currey |
| 7,445,122 B2 | 11/2008 | Currey |
| 7,549,544 B1 | 6/2009 | Currey |
| 7,578,396 B1 | 8/2009 | Garzon |
| 7,661,537 B1 | 2/2010 | Sewell |
| 7,677,396 B2 | 3/2010 | Visscher et al. |
| 7,942,273 B2 | 5/2011 | Campbell et al. |
| 8,127,933 B2 | 3/2012 | Bohlig et al. |
| 8,136,672 B2 | 3/2012 | Bjornson et al. |
| 8,191,714 B2 | 6/2012 | Kalverkamp |
| 8,231,011 B1 | 7/2012 | Currey |
| 8,307,987 B2 | 11/2012 | Miller et al. |
| 8,328,126 B2 | 12/2012 | Bruggencate |
| 8,336,714 B2 | 12/2012 | Campbell et al. |
| 8,356,715 B2 | 1/2013 | Brasseur |
| 8,424,684 B2 | 4/2013 | Campbell et al. |
| 8,459,466 B2 | 6/2013 | Duffy et al. |
| 8,517,181 B1 | 8/2013 | Davis et al. |
| 8,522,983 B2 | 9/2013 | Davis |
| 8,646,615 B2 | 2/2014 | Bruggencate et al. |
| 8,683,918 B1 | 4/2014 | Witham et al. |
| 8,800,781 B1 | 8/2014 | Carlile, Jr. et al. |
| 8,857,621 B2 | 10/2014 | Campbell et al. |
| 8,874,257 B2 | 10/2014 | Sinram et al. |
| 8,893,409 B1 | 11/2014 | Rossi, Jr. |
| 8,939,292 B2 | 1/2015 | Doppstadt et al. |
| 9,027,762 B2 | 5/2015 | Davis et al. |
| 2003/0089645 A1 | 5/2003 | Backers |
| 2003/0116486 A1 | 6/2003 | Davis |
| 2003/0183561 A1 | 10/2003 | Smook |
| 2004/0035764 A1 | 2/2004 | Kreft et al. |
| 2004/0069693 A1 | 4/2004 | Paladin |
| 2004/0079684 A1 | 4/2004 | Davis et al. |
| 2004/0188329 A1 | 9/2004 | Visscher et al. |
| 2005/0126057 A1 | 6/2005 | Currey |
| 2005/0242006 A1 | 11/2005 | Bohlig et al. |
| 2006/0021915 A1 | 2/2006 | Bjornson et al. |
| 2006/0081513 A1 | 4/2006 | Kenny |
| 2006/0081514 A1 | 4/2006 | Kenny |
| 2006/0085212 A1 | 4/2006 | Kenny |
| 2006/0163120 A1 | 7/2006 | Doppstadt et al. |
| 2006/0180524 A1 | 8/2006 | Duncan et al. |
| 2006/0226054 A1 | 10/2006 | Bishop, Jr. |
| 2010/0264069 A1 | 10/2010 | Green et al. |
| 2012/0110971 A1* | 5/2012 | Monchiero .......... A01D 51/002 56/328.1 |
| 2014/0202933 A1 | 7/2014 | Benjamins |
| 2014/0263770 A1 | 9/2014 | Hissong et al. |

FOREIGN PATENT DOCUMENTS

| | | |
|---|---|---|
| BE | 511963 A | 1/1954 |
| CA | 2054615 A1 | 3/1982 |
| DE | 592 126 C | 2/1934 |
| DE | 609 919 C | 2/1935 |
| DE | 618 154 C | 9/1935 |
| DE | 640 551 C | 1/1937 |
| DE | 30 27 651 A1 | 3/1982 |
| DE | 36 36 668 A1 | 5/1988 |
| DE | 39 26 451 C1 | 3/1991 |
| DE | 43 39 510 C1 | 1/1995 |
| DE | 298 03 880 U1 | 6/1998 |
| DE | 198 57 498 C1 | 6/2000 |
| EP | 0 132 217 B1 | 1/1985 |
| EP | 0 382 676 A1 | 8/1990 |
| EP | 0 410 808 B1 | 11/1994 |
| EP | 0 410 807 B1 | 1/1995 |
| EP | 1 005 918 A2 | 6/2000 |
| EP | 0 773 070 B2 | 7/2002 |
| EP | 1 785 199 A2 | 5/2007 |
| EP | 2 436 255 B1 | 6/2014 |
| GB | 754400 A * | 8/1956 ............ A01B 43/00 |
| GB | 878 492 A | 10/1961 |
| GB | 2 145 612 B | 10/1985 |
| GB | 2 222 507 B | 8/1993 |
| GB | 2 356 547 A | 5/2001 |
| GB | 2 407 469 B | 4/2006 |
| SU | 1764712 A1 | 9/1992 |
| WO | WO 89/00893 A1 | 2/1989 |
| WO | WO 92/16311 A1 | 10/1992 |
| WO | WO 97/14514 A1 | 4/1997 |
| WO | WO 97/38568 A1 | 10/1997 |
| WO | WO 00/07743 A1 | 2/2000 |
| WO | WO 03/026384 A1 | 4/2003 |
| WO | WO 2007/112593 A1 | 10/2007 |

\* cited by examiner

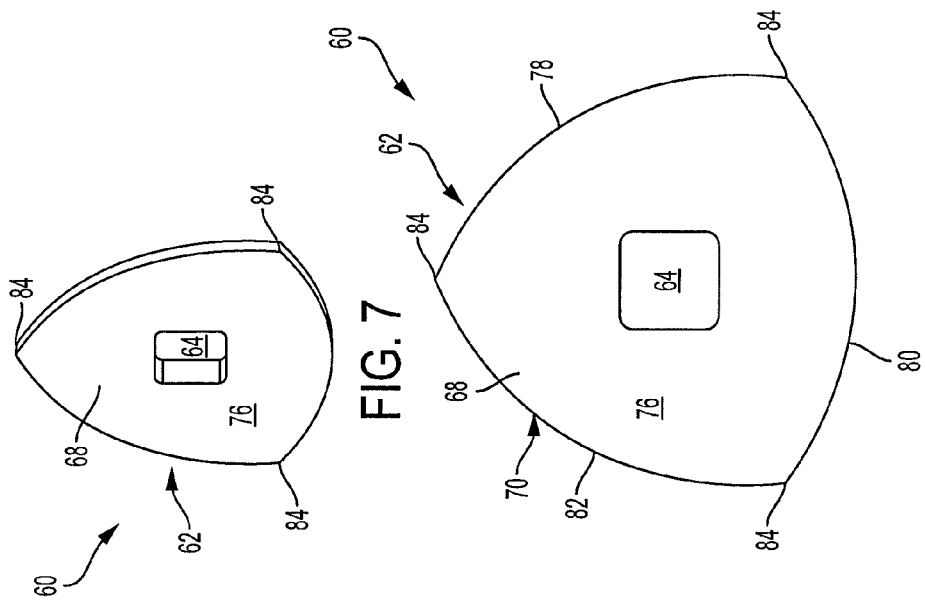
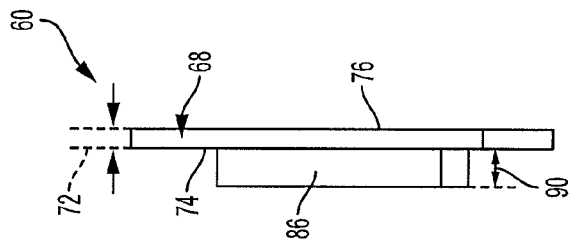
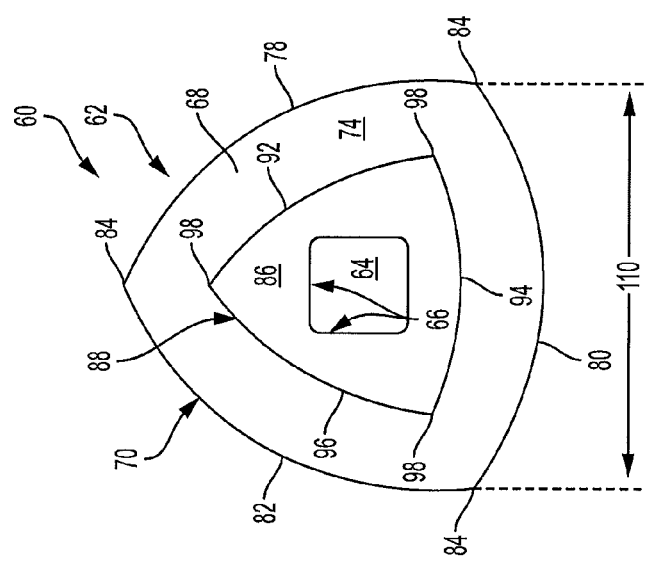

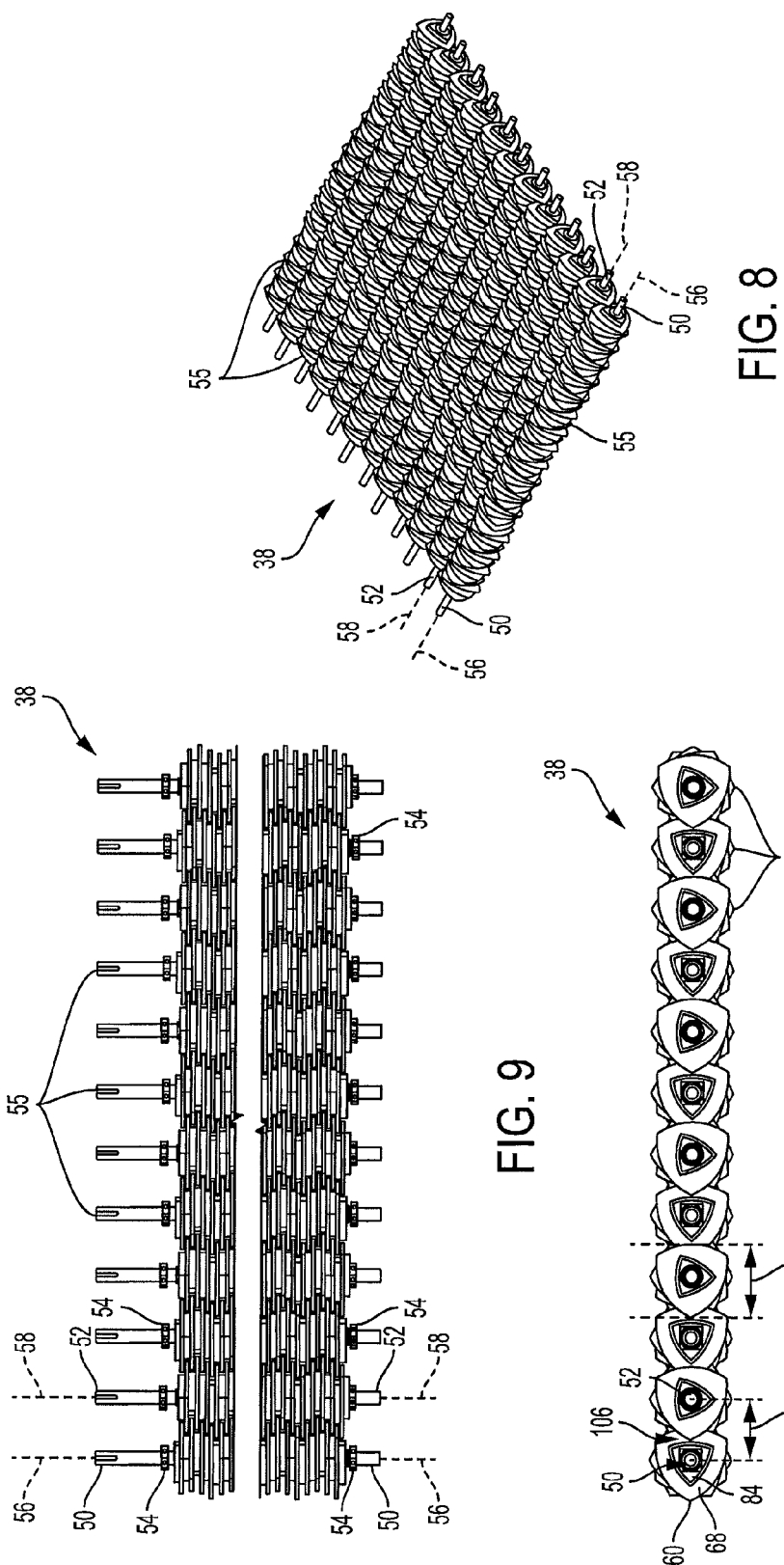

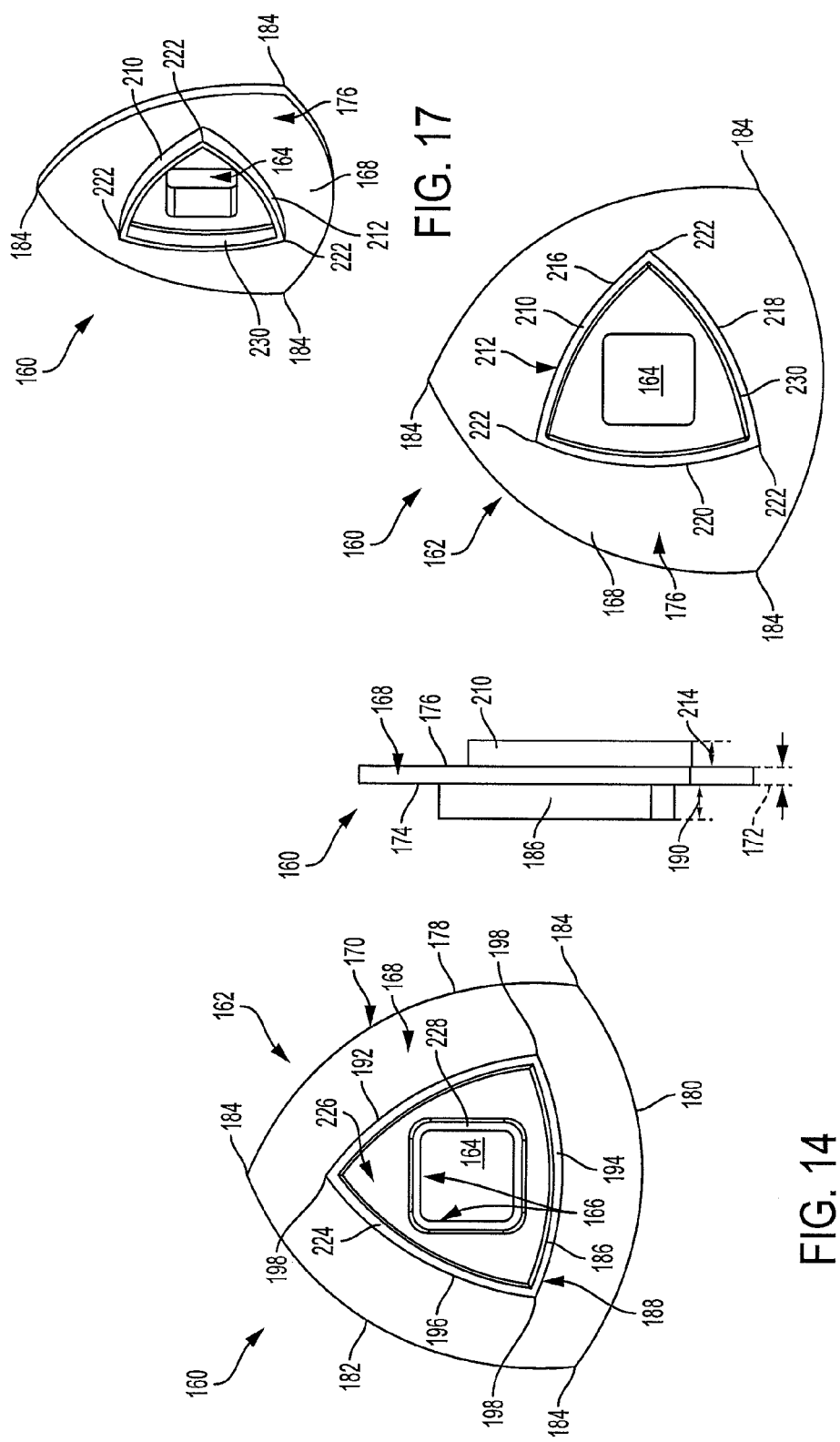

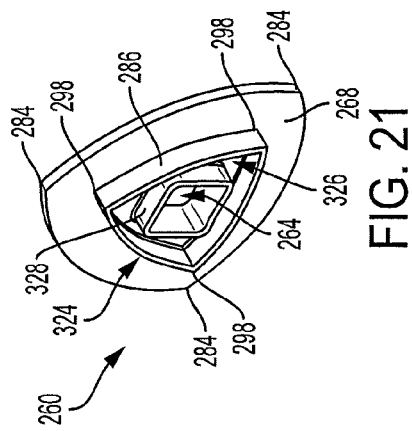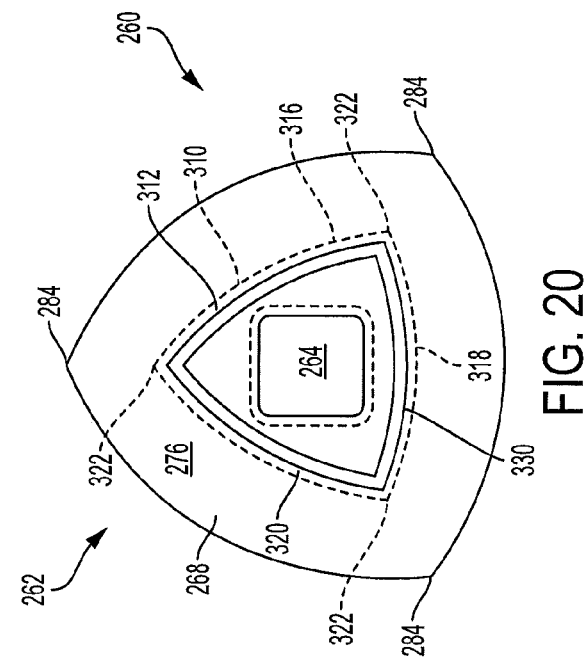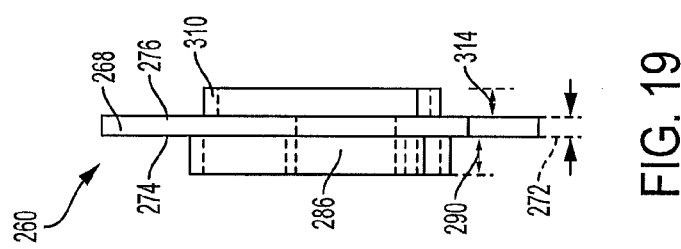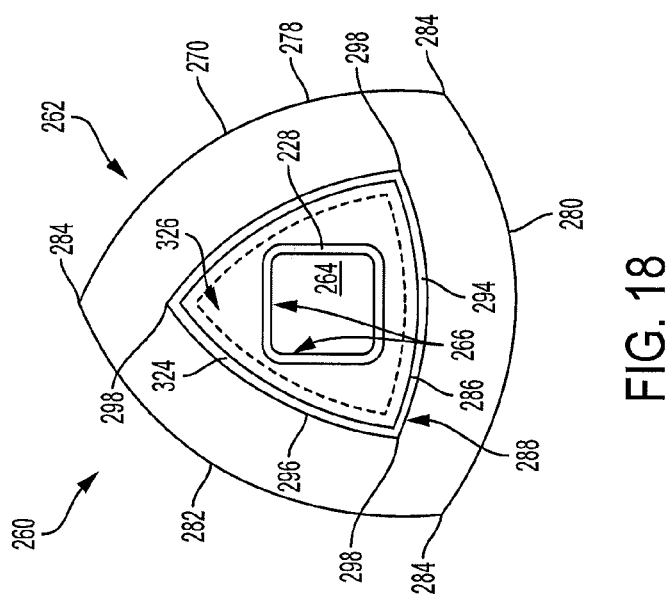

NUT HARVESTER WITH SEPARATING DISKS

BACKGROUND

The present disclosure relates generally to systems and methods for separating various materials. In particular, the present disclosure relates to harvesters and separating various crops, for example tree nuts, from twigs, dirt, dust, and other debris.

Some harvesters presently on the market use various screening/roller assemblies to separate debris from harvested crop product. Separation of the debris from the crop in or near the location of harvesting may decrease the weight of the harvested crop and thus the cost of transportation, decrease the cost of disposal of the debris because it may be left in or near the harvesting location, and decrease the likelihood of contamination of the harvested product with the debris during transport. These screening/roller assemblies may have a series of rotating spaced parallel shafts, each of which has a series of disks. The screening/roller assemblies permit debris to pass downward through spaces between disks, while the harvested crop product remains over the disks and advances out of the screening/roller assembly to a collector. U.S. Pat. No. 8,683,918 presents an example of a known harvester.

A problem with known harvesters, such as the one of U.S. Pat. No. 8,683,918, is jamming. Screening/roller assemblies having disks with teeth or open-ended slots along the edge of the disk may create non-uniform spacing between disks on adjacent parallel shafts during rotation. The non-uniform spacing can result in debris or crop product being caught and jamming up the disks causing stoppages. Even if the jamming may not cause the entire apparatus to stop completely, it may cause momentary stoppages. Such stoppages may cause substantial mechanical shock that eventually results in premature failure of various components of the screening/roller assembly.

Disks that do not have open-ended slots along the edge of the disk are known, for example as disclosed in U.S. Pat. No. 5,960,964. However, assemblies such as the one in U.S. Pat. No. 5,960,964 have large axial gaps between disks mounted along a common shaft. These axial gaps are much larger than the radial gaps between cooperating disks on adjacent parallel rotation shafts. Such assemblies are not suitable for separating crop product from debris. Some crop product and debris will fall through the large gaps while other crop product and debris will not fall through the smaller gaps between the disks. Thus, such assemblies cannot reliably sort crop product from debris.

Another problem with known harvesters is dust created by the harvester. Typically, harvesters utilize high-volume air generated by an on-board fan assembly to assist the screening/roller assemblies in separating crop product from debris. These fan assemblies generate large amounts of dust. The dust can result in air pollution, water pollution, soil loss, human and animal health problems, and hazardous reductions in visibility during operation of the harvester. Additionally, dust can adversely impact various plants and crop product. Dust generation from agricultural machinery is particularly problematic in arid areas or areas with dusty or sandy soil conditions. In an effort to reduce dust production, some jurisdictions impose various air pollution control measures on agricultural equipment.

Thus, a need exists a need for improved systems for reliably and effectively separating harvested crop product from debris without being prone to jamming or generating large amounts of dust.

SUMMARY

In one aspect of the present disclosure, a disk is provided for use in a harvester. The disk can have a non-circular unitary body, a hole extending through the body, a first segment of the body, and a second segment of the body. The hole extending through the body defines a first rotational axis. The second segment is adjacent to the first segment, and a second outside perimeter of the second segment is smaller than a first outside perimeter of a first segment. The first segment has a first segment thickness and the second segment has a second segment thickness.

The disk can be configured to cooperate with disks mounted along a second rotational axis parallel to the first rotational axis, whereby a first axial gap and a second axial gap between cooperating disks combine to equal the second segment thickness minus the first segment thickness, and a radial gap is defined by a distance between the first outside perimeter of a disk mounted along the first rotational axis and a second outside perimeter of a cooperating disk mounted along the second rotational axis.

In another aspect of the present disclosure, a roller assembly is provided. The roller assembly can include a first roller including a plurality of disks mounted to rotate about a first rotational axis; a second roller including a plurality of disks mounted to rotate about a second rotational axis; wherein the disks are noncircular and configured to cooperate with the disks mounted adjacent along the first roller and with corresponding disks mounted along the second roller, whereby the gaps formed between the disks are effectively constant during rotation of the rollers. In another aspect, the roller assembly can include a first rotational shaft mounted to a roller assembly frame, wherein the first rotational shaft coincides with a first rotational axis and includes a plurality of disks axially mounted thereon, and a second rotational shaft mounted to the roller assembly frame parallel to the first rotational shaft, wherein the second rotational shaft coincides with a second rotational axis and includes a plurality of disks axially mounted thereon. The plurality of disks can have a non-circular unitary body, a hole extending through the body, a first segment of the body, and a second segment of the body. The hole extending through the body coincides with a rotational axis. The second segment is adjacent to the first segment, and a second outside perimeter of the second segment is smaller than a first outside perimeter of a first segment. The first segment has a first segment thickness and the second segment has a second segment thickness.

The plurality of disks can be configured to cooperate with disks mounted adjacent along the first rotational shaft and disks mounted along the second rotational shaft, whereby a first axial gap and a second axial gap between cooperating adjacent disks along the first rotational shaft combine to equal the second segment thickness minus the first segment thickness, and a radial gap is defined by a distance between the first outside perimeter of disks mounted along the first rotational shaft and the second outside perimeter of cooperating disks mounted along the second rotational shaft.

In another aspect of the present disclosure, a nut harvester is provided. The nut harvester can include a roller assembly, a roller assembly drive mechanism, a linkage for operating a roller assembly, a fan assembly, and an exit conveyor. The roller assembly can include a first rotational shaft mounted to a frame, wherein the first rotational shaft coincides with a first rotational axis and includes a plurality of disks axially mounted thereon, and a second rotational shaft mounted to the frame parallel to the first rotational shaft, wherein the second rotational shaft coincides with a second rotational axis and includes a plurality of disks axially mounted thereon.

Each of the plurality of disks can have a non-circular unitary body, a hole extending through the body, a first segment of the body, and a second segment of the body. The hole extending through the body coincides with a rotational axis. The second segment is adjacent to the first segment, and a second outside perimeter of the second segment is smaller than a first outside perimeter of a first segment. The first segment has a first segment thickness and the second segment has a second segment thickness.

The plurality of disks can be configured to cooperate with disks mounted adjacent along the first rotational shaft and disks mounted along the second rotational shaft, whereby a first axial gap and a second axial gap between cooperating adjacent disks along the first rotational shaft combine to equal the second segment thickness minus the first segment thickness, and a radial gap is defined by a distance between the first outside perimeter of disks mounted along the first rotational shaft and the second outside perimeter of cooperating disks mounted along the second rotational shaft.

The apparatuses described here improve crop product harvesting by cleanly separating crop product from dirt, dust, and debris without being prone to jamming. The relatively clean separating of crop product from dirt, dust, and debris allows for less reliance on a fan assembly, and in some instances the fan assembly does not need to be operated at all. Thus, the apparatuses described here can significantly reduce dust generation.

In another aspect of the present disclosure, a method for removing dirt and debris from harvested crop product is provided. The method includes providing a roller assembly, simultaneously rotating a first and second rotational shaft of the roller assembly, and allowing dirt and debris to fall through spacing gaps in the roller assembly. The roller assembly can include the first rotational shaft mounted to a roller assembly frame, wherein the first rotational shaft coincides with a first rotational axis and includes a plurality of disks axially mounted thereon, and a second rotational shaft mounted to the roller assembly frame parallel to the first rotational shaft, wherein the second rotational shaft coincides with a second rotational axis and includes a plurality of disks axially mounted thereon.

Each of the plurality of disks can have a non-circular unitary body, a hole extending through the body, a first segment of the body, and a second segment of the body. The hole extending through the body coincides with a rotational axis. The second segment is adjacent to the first segment, and a second outside perimeter of the second segment is smaller than a first outside perimeter of a first segment. The first segment has a first segment thickness and the second segment has a second segment thickness.

The plurality of disks can be configured to cooperate with disks mounted adjacent along the first rotational shaft and disks mounted along the second rotational shaft, whereby a first axial gap and a second axial gap between cooperating adjacent disks along the first rotational shaft combine to equal the second segment thickness minus the first segment thickness, and a radial gap is defined by a distance between the first outside perimeter of disks mounted along the first rotational shaft and the second outside perimeter of cooperating disks mounted along the second rotational shaft.

BRIEF DESCRIPTION OF THE DRAWINGS

FIG. 4 is a front view of a disk to be used in the roller assembly of FIG. 2 according to a first exemplary embodiment.

FIG. 5 is a side view of the disk of FIG. 4.

FIG. 6 is a back view of the disk of FIG. 4.

FIG. 7 is a perspective view of the back of the disk of FIG. 4.

FIG. 8 is a perspective view of a roller assembly of FIG. 2.

FIG. 9 is a top view of the roller assembly of FIG. 8.

FIG. 10 is a side view of the roller assembly of FIG. 8.

FIG. 14 is a front view of a disk to be used for the harvester of FIG. 1 according to a second exemplary disk embodiment.

FIG. 15 is a side view of the disk of FIG. 14.

FIG. 16 is a back view of the disk of FIG. 14.

FIG. 17 is an isometric view of the back of the disk of FIG. 14.

FIG. 18 is a front view of a disk to be used for the harvester of FIG. 1 according to a third exemplary disk embodiment.

FIG. 19 is a side view of the disk of FIG. 18.

FIG. 20 is a back view of the disk of FIG. 18.

FIG. 21 is an isometric view of the front of the disk of FIG. 18.

DETAILED DESCRIPTION OF PREFERRED EMBODIMENTS

Figure 1:
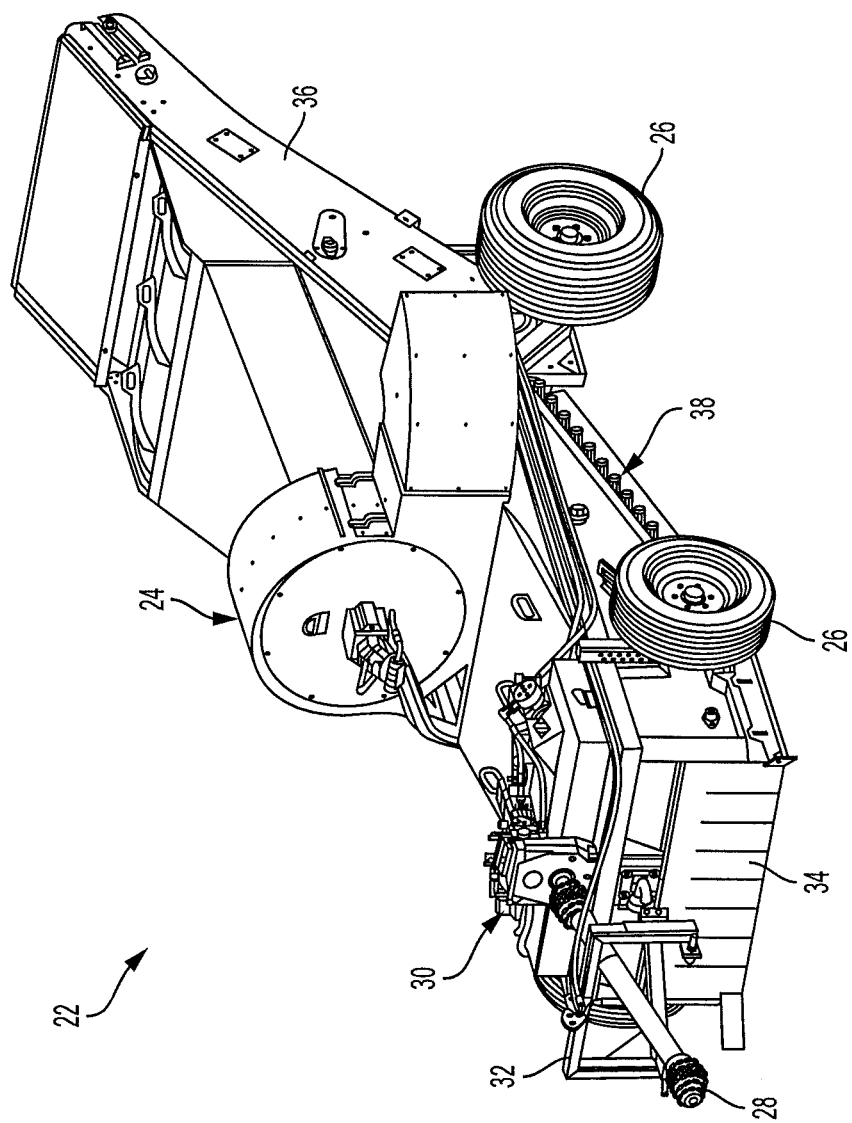
FIG. 1 is an isometric view of a harvester according to an exemplary embodiment.
Figure 2:
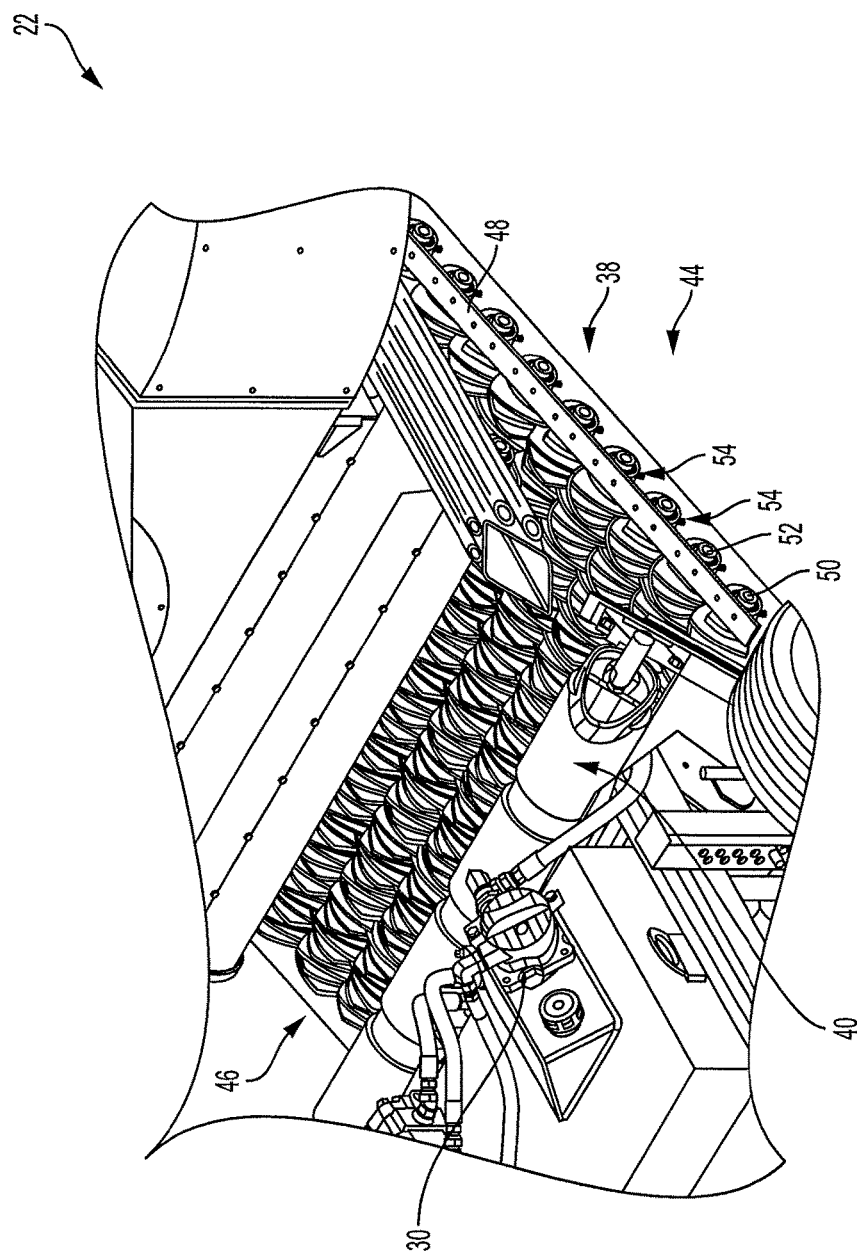
FIG. 2 is a perspective view of a roller assembly positioned in the harvester of FIG. 1.

Refer now to FIGS. 1 and 2, there being shown a harvester 22 according to an exemplary embodiment. The harvester 22 is pulled along a row of crop product, for example tree nuts. The harvester 22 is connected to a towing vehicle (not pictured) by a hitch 32. Alternatively, the harvester 22 can be pushed or have its own drive motor. The harvester 22 includes a fan assembly 24, front and back wheels 26, a power take-off 28, a hydraulic pump 30, the hitch 32, a crop product collection mechanism 34, an exit conveyor 36, and a roller assembly 38. The crop product is collected by the collection mechanism 34, which can be a rotating sweeper or other suitable collection mechanism. Alternatively, the crop product can be collected by another machine. After it is collected, crop product is fed to the top of the roller assembly 38. The roller assembly 38 operates to separate the crop product from dirt, dust, and debris. The dirt, dust, and debris pass through the roller assembly 38, while the crop product stays above the roller assembly 38. The crop product is passed to the exit conveyor 36 to be collected with the rest of the separated crop product.

The harvester 22 has a power take-off 28 that drives a hydraulic pump 30. The hydraulic pump 30 drives a hydraulic motor 40 that then mechanically drives the roller assembly 38. The hydraulic motor 40 has a mechanical connection 42 to rotational shafts of the roller assembly 38 by a series of belts or chains 42. When the power take-off 28 is engaged, power is transferred from the towing vehicle (not pictured) to the rotational shafts through the power take-off 28, the hydraulic pump 30, the hydraulic motor 40, and the mechanical connection 42. Alternatively, the harvester 22 can be configured to transfer power from the towing vehicle to the rotational shafts entirely mechanically, without the use of hydraulic pumps and motors. In other embodiments, the harvester 22 can have a mechanical transmission for transfer of the power from the power take-off to the rotating shafts, or can have its own power generation source that transfers mechanical power to the rotational shafts. In this later embodiment, the harvester 22 does not require a power take-off connected to a towing vehicle.

FIG. 2 shows a perspective view of the roller assembly 38 of the harvester 22. The roller assembly 38 is mounted in the harvester 22 and includes a roller assembly frame 48, a plurality of rotational shafts, for example a first rotational shaft 50 and a second rotational shaft 52, and end collars 54.

Each rotational shaft turns on its rotational axis. For example, with reference to FIG. 9, the first rotational shaft 50 has a first rotational axis 56. The second rotational shaft 52 has a second rotational axis 58. In embodiments having third, fourth, fifth, and more rotational shafts, the rotational shafts would have third, fourth, fifth, and more rotational axes, respectively. The rotational shafts are parallel to each other. Each rotational shaft includes an end collar 54 that is securely fastened on one side or on both sides of the rotational shaft. The end collars 54 prevent a plurality of disks 60 mounted on the respective rotational shaft from sliding.

Figure 3:
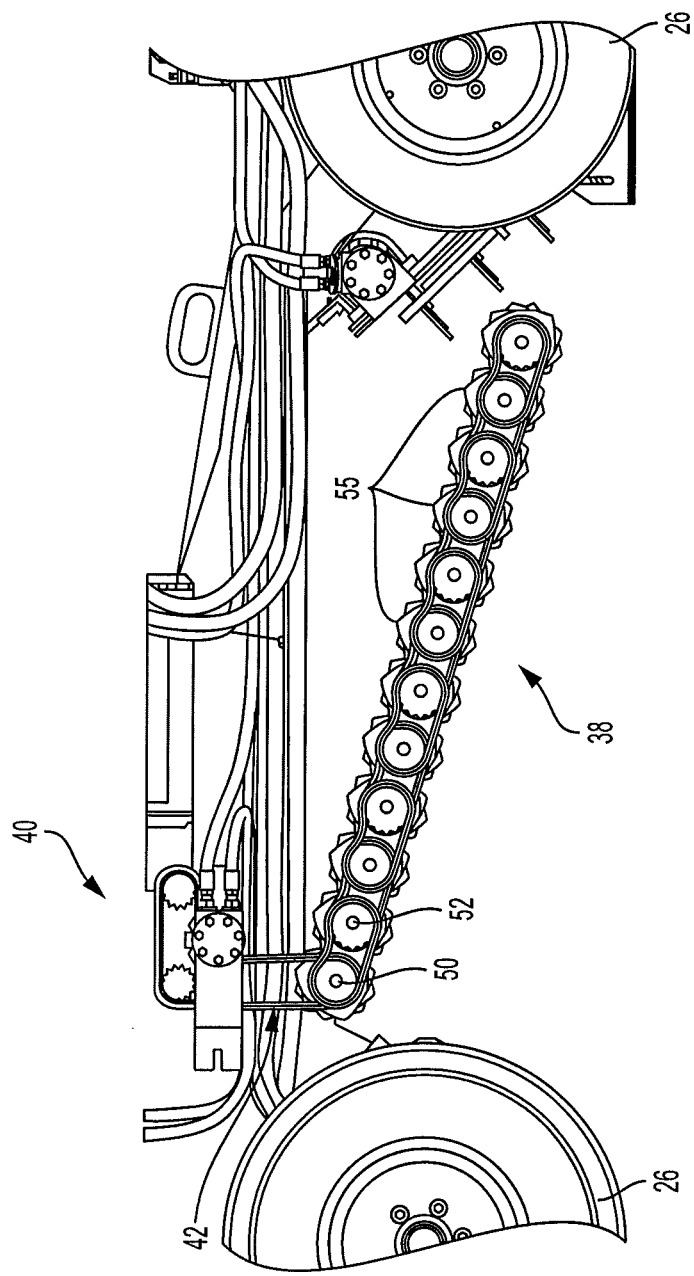
FIG. 3 is a side view of the roller assembly in the harvester of FIG. 2.

With reference to FIG. 3, a side view of the harvester 22, and particularly the roller assembly 38, is illustrated. The roller assembly 38 of FIG. 3 includes twelve rollers 55, each including disks mounted on rotational shafts. The mechanical connection 42 connects the rotational shafts to hydraulic motor 40. The hydraulic motor 40 is hydraulically coupled to the hydraulic pump 30, which in turn is coupled to the power take off 28. Thus, the rotational shafts are turned by transferring power from the power take off 28 to the rotational shafts. The rotational shafts are all rotated in the same direction at about the same speed. In other embodiments, opposed disks having different shapes from each other may be used, such as for example a triangular shaped disk opposed to a square shaped disk, in which case the rotation speeds of the corresponding shafts would be different from one another to maintain spacing between the disks.

The rotational shafts, for example the first rotational shaft 50 and the second rotational shaft 52, each have a plurality of disks 60 mounted axially along the shaft. The disks 60 mounted along the first rotational shaft 50 cooperate with corresponding disks 60 mounted along the second rotational shaft 52.

Spacing between the disks 60 depends on the shape of the disks 60 and the distance between adjacent disks. The disks 60 are designed so that as they rotate, the spacing between cooperating disks 60 remains effectively constant. "Effectively constant" for purposes of this description means that the spacing remains sufficiently constant for the purposes of separating crop product from twigs, dirt, dust, and other debris. The effectively constant spacing is important for separating crop product from twigs, dirt, dust, and other debris, without being prone to jamming.

Refer now to FIGS. 4-7, showing an exemplary embodiment of the disk 60. The disk 60 has a non-circular unitary body 62 with a hole 64 extending through the body 62. The body 62 has a first segment 68 and a second segment 86.

The first segment 68 of the body 62 has a first outside perimeter 70. The first outside perimeter 70 has a plurality of disk sides, including a first side 78, a second side 80, and a third side 82. The sides meet at apexes 84 of the first outside perimeter 70. As illustrated in FIG. 5, the first segment 68 has a first segment thickness 72. The first segment 68 further has a first face 74 and a second face 76.

The second segment 86 of the body 62 is adjacent to the first segment 68 and is positioned on the first face 74 or second face 76 of the first segment 68. In the exemplary embodiment of FIGS. 4-7, the second segment 86 is positioned on the first face 74 of the first segment 68. The second segment 86 has a second outside perimeter 88 that has a plurality of disk sides, including a first side 92, a second side 94, and a third side 96. The sides meet at apexes 98 of the second outside perimeter 88.

The second segment 86 has a second segment thickness 90 that is greater than the first segment thickness 72. In an exemplary embodiment, the second segment thickness 90 can be approximately twice as thick as the first segment thickness 72. In alternative embodiments, the second segment thickness 90 may be greater than twice as thick as the first segment thickness 72, or less than twice as thick has the first segment thickness 72. The first and second segment thicknesses 72, 90 impact the size of the gap between disks. Therefore, the thicknesses may be any suitable thickness depending on the crop product or other material to be separated from debris. Since gaps between disks must be smaller than the crop product or other material to be separated from the debris, the relative thicknesses of the first segment and second segments may be different for different crop products.

The hole 64 has a number of hole sides 66 that differs from the number of sides of the first and second outside perimeters 70, 88. In the exemplary embodiment of FIGS. 4-7, the hole 64 has four hole sides 66. Alternatively, the hole 64 may have any suitable number of hole sides. By providing the hole 64 with a different number of hole sides 66 than the outside perimeters and providing a rotational shaft with sides matching the hole, the disk 60 can be mounted along the rotational shaft at different orientations as compared to adjacent disks. For example, the apexes 84 of the first outside perimeter 70 can be offset from the apexes 84 of the first outside perimeter 70 of an adjacent disk 60 mounted along the same rotational shaft. In other embodiments, other arrangements could be used to obtain the desired angular disk offset, such as for example a splined hole and shaft arrangement, or a round shaft, a round disk hole, and a set screw arrangement, to fix the disks at the desired angles.

The disks 60 are designed so that axial spacing between adjacent disks 60 mounted along the same rotational shaft remains effectively constant during operation. Furthermore, radial spacing between disks 60 on parallel shafts also remains effectively constant. Thus, during operation, about the same amount of space between disks will be present regardless of the rotational position of the disks 60. Moreover, the size and thickness of the disks may be configured to cooperate with the disks mounted adjacent along the first roller and with corresponding disks mounted along the second roller, whereby the gaps formed between the disks are effectively constant during rotation of the rollers. The effectively constant spacing allows for uniform separation of crop product from dirt, twigs, dust, and other debris.

The first segment 68 of a disk 60 on the first rotation shaft 50 cooperates with the second segment 86 of a corresponding disk 60 on the second rotational shaft 52. Similarly, the first segment 68 of a disk 60 on the second rotation shaft 52 cooperates with the second segment 86 of a corresponding disk 60 on the first rotational shaft 50. The shape of the first outside perimeter 70 and the second outside perimeter 88 allow cooperating disks on parallel shafts to maintain effectively constant spacing between each other. Referring to FIGS. 4-7, the first side 78, second side 80, and third side 82 of the first segment 68 are arcs that connect the apexes 84. Similarly, the first side 92, second side 94, and third side 96 of the second segment 86 are also arcs that connect the apexes 98. The arcs of the first segment 68 cooperate with the arcs of the second segment 86 on a corresponding disk 60. In the illustrated embodiment, the arcs of the first segment 68 have the same radius of curvature as the arcs of the second segment 86, and the radius is based on the radius of a circle. This allows for the spacing between cooperating disks 60 to remain effectively constant throughout the entire rotation of the disks.

The radius of the arcs can be adjusted as necessary depending on the desired application. Generally, as the size of the second outside perimeter 88 increases, the radius of its arcs decreases. As the radius of the arcs decreases, the first and second outside perimeters 70, 88 become more circular. Conversely, as the size of the second outside perimeter 88 approaches the size of the first outside perimeter 70, the radius of the arcs increases. A larger arc radius thereby creates sharper points on the first and second outside perimeters 70, 88. Perimeters having sharper points result in more agitation and less space for debris to fall through. More circular perimeters result in less agitation but more space for debris to fall through.

The first and second outside perimeters can alternatively be any suitable polygon. For example, if the polygon has four sides, the first and second outside perimeters would each have four apexes and four arcs connecting the apexes. The radius for the arcs can be calculated for any polygon by solving Eq. 1 for R:

$$0 = -\sqrt{R^2 - \left(\frac{S_L}{2}\right)^2} + (\cos(\theta) - 1)\left(\frac{S_L - S_S}{2\sin(\theta)}\right) + \sqrt{R^2 - \left(\frac{S_S}{2}\right)^2} \quad \text{Eq. 1}$$

S sub L is the length of a side of the large polygon, S sub S is the length of the small polygon, and theta is the degrees of a bisected, included angle of the polygon (360/number of sides/2).

Alternatively, the first and second outside perimeters 70, 88 can be approximately a Reuleaux triangle. A Reuleaux triangle is a shape formed from the intersection of three circles of the same size, each having its center on the boundary of the other two. The three center points form the three apexes of the Reuleaux triangle, with the resulting shape having an effectively constant width regardless of its orientation. Alternatively, other suitable shapes may also be used.

The first outside perimeter 70 and the second outside perimeter 88 are effectively the same shape but have different sizes. In the illustrated embodiment, the size relationship (or scale) of the first outside perimeter 70 to the second outside perimeter 88 is about three to two. However, other scales may be used as appropriate for the crop product or other material being processed. The scale impacts the size of the gaps between cooperating disks.

With reference to FIGS. 8-12, an exemplary embodiment of the roller assembly 38 is illustrated. The roller assembly 38 includes at least two rollers 55 having rotational shafts each having a rotational axis. For example, the first rotational shaft 50 has a first rotational axis 56 and the second rotational shaft 52 has a second rotational axis 58.

Gaps between cooperating disks remain effectively constant during rotation. The first outside perimeter 70 of a disk 60 is configured to cooperate with the second outside perimeter 88 of a corresponding disk 60 mounted on an adjacent rotational shaft. The space between disks 60 mounted along the first rotational shaft 50 and disks 60 mounted along the second rotational shaft 52 creates axial and radial gaps.

Figure 11:
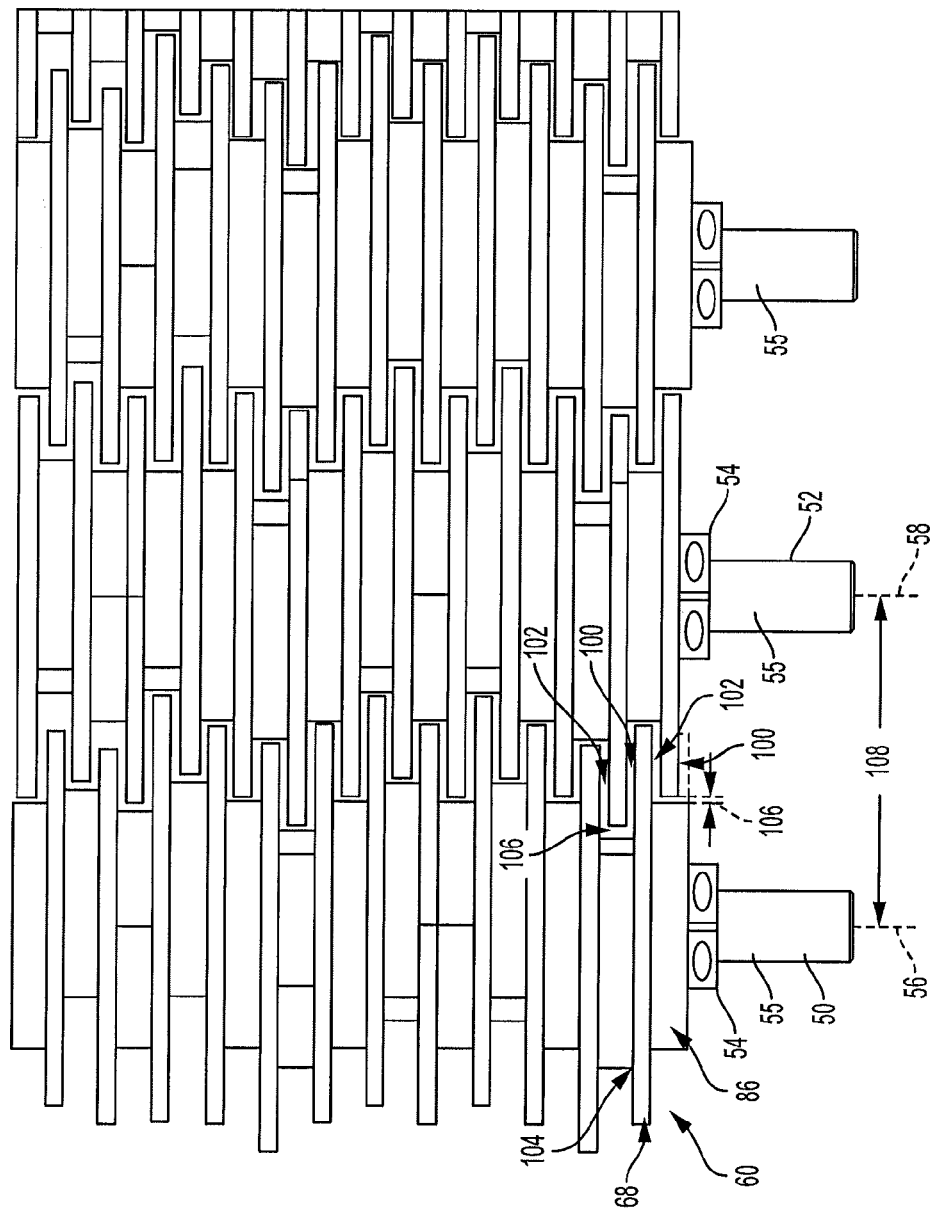
FIG. 11 is a close-up top view of the roller assembly of FIG. 9.
Figure 12:
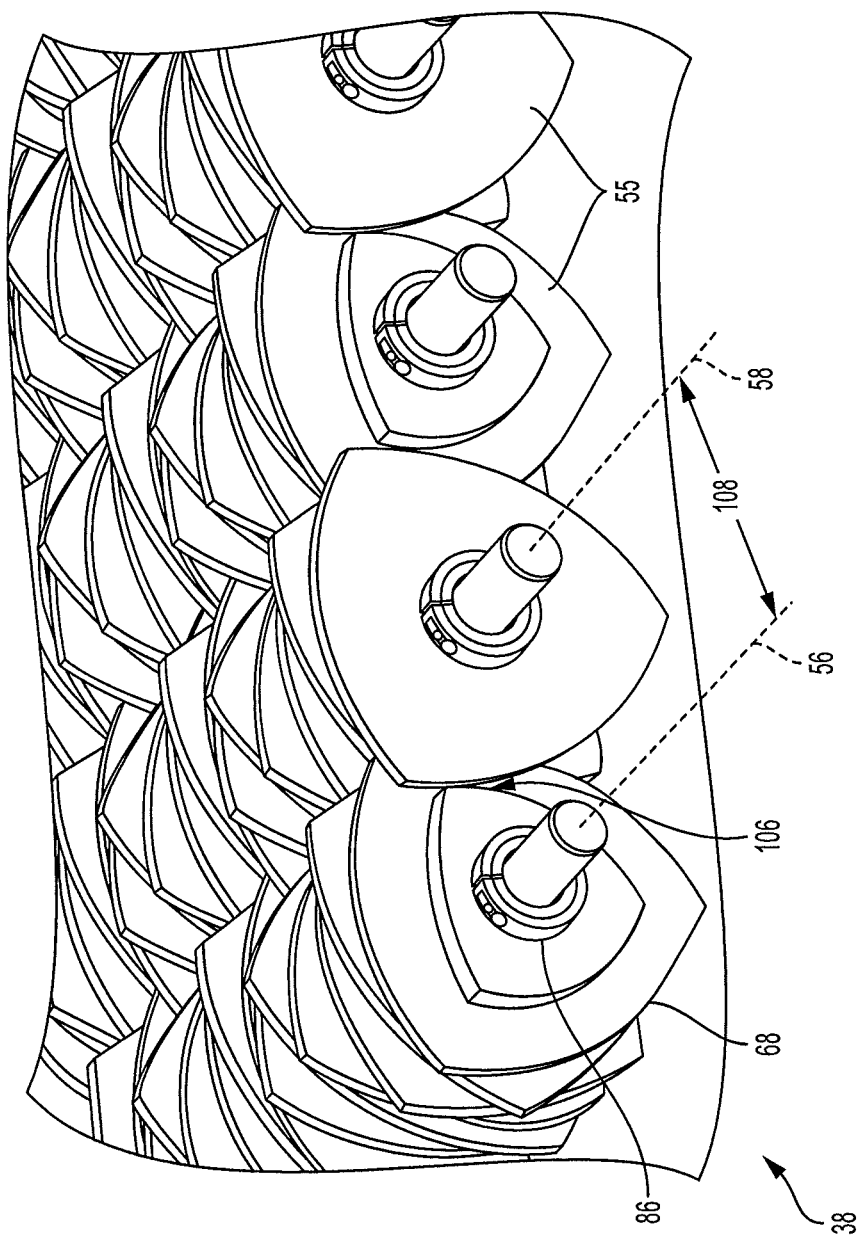
FIG. 12 is a close-up isometric view of the roller assembly of FIG. 8.

In the example embodiment of FIGS. 8-12, the disks 60 are mounted along a rotational shaft without spaces between adjacent disks. In such embodiments, a first axial gap 100 and a second axial gap 102 between cooperating disks combine to equal the second segment thickness 90 minus the first segment thickness 72. As shown in FIG. 11, an axial spacing distance 104 is essentially zero. Alternative embodiments may have a non-zero axial spacing distance 104. In such embodiments, the first axial gap 100 and the second axial gap 102 add up to equal the axial spacing distance 104 plus the second segment thickness 90 minus the first segment thickness 72.

With reference to FIG. 11, a radial gap 106 is defined by a distance between the first outside perimeter 70 of disks 60 mounted on the second rotational shaft 52 and the second outside perimeter 88 of cooperating disks mounted on the first rotational shaft 50. The radial gap 106 depends on the distance between the parallel rotational shafts and sizes of the disk segments 68, 86, including the width 110 of the disk 60, which in the illustrated embodiment is the width of the disk segment 68. If the rotational shafts are further apart, then the radial gap 106 would be larger. The distance between rotational shafts is a radial spacing distance 108. The radial spacing distance 108 is measured from a center point of the first rotational axis 56 to a center point of the second rotational axis 58. Although only one radial gap 106 is labeled in FIG. 11, radial gaps exist between all the cooperating disks and disk segments of the illustrated roller assembly 38. Since cooperating disks 60 are the same size and shape, the disks 60 can be arranged to achieve essentially constant radial gaps 106 throughout the roller assembly 38.

The shapes of the disks allow the radial gap 106 to remain effectively constant during rotation. However, due to the non-circular shape of the first and second outside perimeters 70, 88, the location of the radial gap 106 constantly moves when the shafts are rotating. The disk 60 has a first segment 68 with three sides (arcs) and three apexes 84. When the apexes 84 are pointed directly at an adjacent parallel shaft, the first segment 68 is at an approximately maximum point. When the middle of an arc is pointed directly at an adjacent parallel shaft, the first segment 68 is at an approximately minimum point.

The first segment 68 cooperates with a second segment 86 of a cooperating disk 60 on a parallel shaft. Similar to the first segment 68, the second segment 86 as three sides (arcs) and three apexes 98. When the apexes 98 are pointed directly at an adjacent parallel shaft, the second segment 86 is at an approximately maximum point. When the middle of an arc is pointed directly at an adjacent parallel shaft, the second segment 86 is at an approximately minimum point.

In order for the radial gap 106 to remain effectively constant, the cooperating disks 60 rotate in a complimentary fashion. When the first segment 68 of a disk on the first rotational shaft 50 is at an approximately maximum point, the second segment 86 of a cooperating disk on the second rotational shaft 52 is at an approximately minimum point. As the disks 60 perform one full rotation, they each cycle through three maximum points (the number of apexes) and three minimum points (the number of arcs). Alternative embodiments with a different number of apexes and arcs would have a corresponding number of maximum and minimum points during one full rotation.

Throughout one full rotation, the radial gap 106 remains effectively constant due to the complimentary arrangements of the disks. This also illustrates that the physical position of the radial gap 106 constantly moves while the disks 60 rotate. When the first segment 68 of a disk on the first rotational shaft 50 is at an approximately maximum point, the location of the radial gap 106 will be closer to the second rotational shaft 52. When the first segment 68 of a disk on the first rotational shaft 50 is at an approximately minimum point, the location of the radial gap 106 will be closer to the first rotational shaft 50. In this way, the roller assembly 38 generates an advantageous sifting or agitation effect.

The agitation increases the effectiveness of the roller assembly 38 in separating crop product or other material from debris, while still maintaining effectively constant gap sizes. This is in contrast to toothed disks, where the gap between disks depends on the position of the disk. The disparity in gap distance in toothed disks tends to pinch materials between a disk and its cooperating disk, which may result in frequent jamming. The present disks 60 overcome this issue while also advantageously moving debris up and down in a fashion that creates a sifting effect.

The roller assembly 38 includes disks 60 mounted along a rotational shaft. Each disk 60 has a different orientation from the disks adjacent to it. Since the hole 64 has four sides, adjacent disks 60 can be mounted to a four-sided rotational shaft such that a different hole side is at a top side of the shaft. For example, each adjacent disk can be mounted at ninety degree turns from each other. Since the three arcs are all the same length, the effect is that mounting adjacent disks 60 at ninety degree turns from each other results in the apexes 84 being offset by thirty degrees. In other embodiments, other arrangements could be used to obtain the desired angular disk offset, such as for example using a round shaft, a round disk hole, and a set screw to fix the disk at the desired angle.

As illustrated in FIG. 2, the roller assembly 38 has alternating sets of right and left disks that are designed to direct the flow of the crop product away from the edges during conveyance. Starting from a first end 44 of the rotational shaft 54, a set of left disks are axially mounted up to about one-quarter of the length of the rotational shaft 54. Going from the first end 44 to a second end 46, the apexes 84 of each subsequent adjacent left disk are rotated counterclockwise (left) by approximately thirty degrees. Right disks are mounted on the second quarter of the rotational shaft 54. Going from the first end 44 to the second end 46, the apexes 84 of each subsequent adjacent right disk are rotated clockwise (right) by approximately thirty degrees. The third quarter alternates back to the left disks, and the fourth quarter alternates back to the right disks. The alternating sets of right and left disks creates more agitation of the crop product and conveys the crop product away from the first end 44 and the second end 46.

Figure 13:
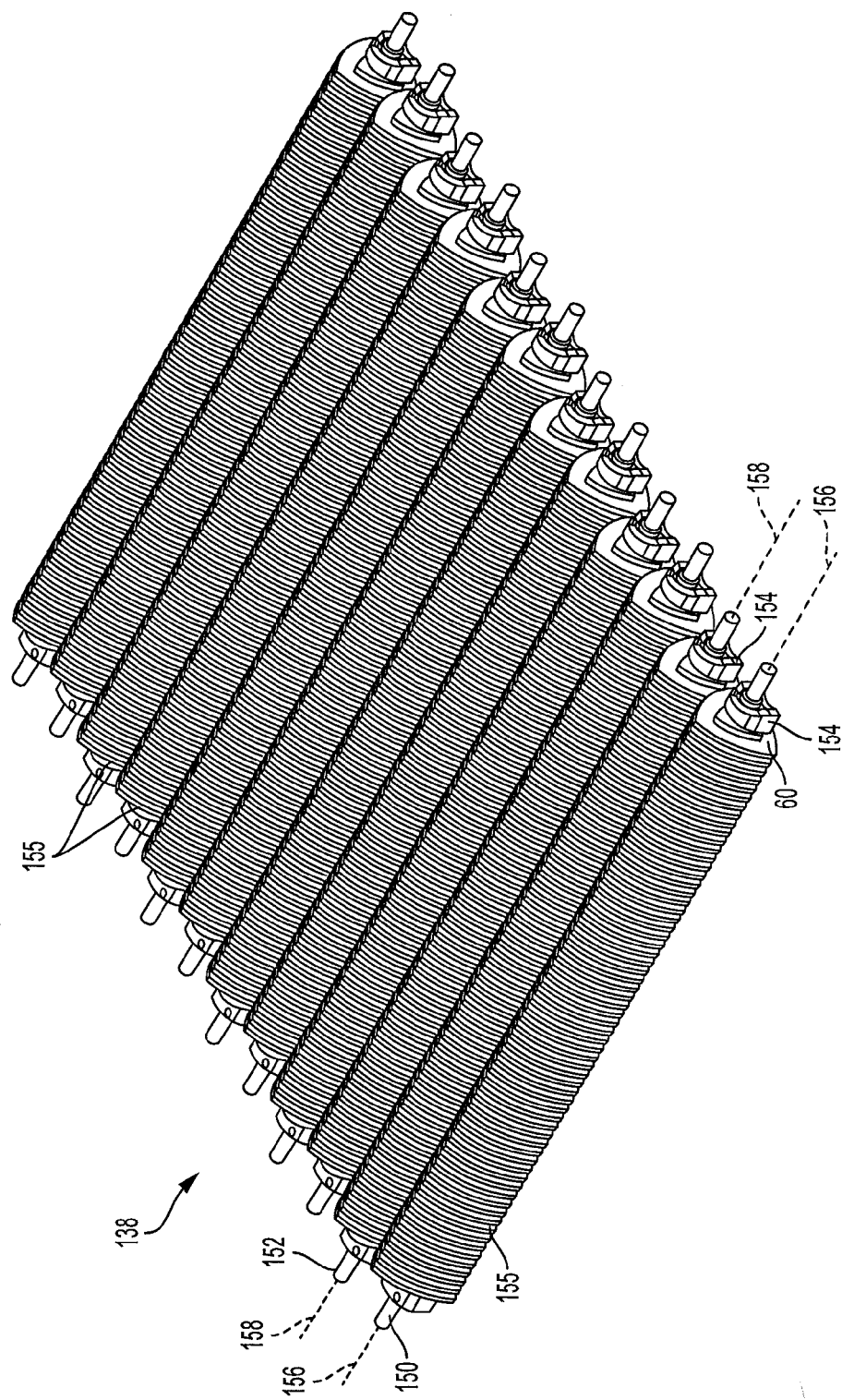
FIG. 13 is an isometric view of a roller assembly for the harvester of FIG. 1 according to a second exemplary roller embodiment.

Refer now to FIG. 13, there being shown a second exemplary embodiment of a roller assembly 138 to be used in the harvester 22. Similar to the first embodiment of the roller assembly 38, the second embodiment of the roller assembly 138 has a plurality of rollers 155, each including a plurality of disks 60 axially mounted on a first rotational shaft 150 that has a first rotational axis 156, and a plurality of disks 60 axially mounted on a second rotational shaft 152 that has a second rotational axis 158. Each rotational shaft includes an end collar 154 that is securely fastened on one side or on both sides of the respective rotational shaft. The roller assembly 138 may include more rotational shafts and rotational axes.

The second embodiment of the roller assembly 138 differs from the first embodiment in that the disks 60 are oriented in the same direction such that the apexes 84 of the first outside perimeter 70 of adjacent disks 60 are aligned. Such an alignment of the disks 60 creates a wave-type agitation action in the crop product during operation that allows the debris to fall out and separate from the crop product.

Other alignments of adjacent disks mounted along a rotational shaft are also possible. For example, disks can be grouped in sets of two, where the two disks in the set are aligned with each other but offset from adjacent sets of two. Similarly, sets of three may be used. Any arrangement between disks mounted along a rotational axis may be suitable, as long as the disks mounted on adjacent parallel shafts cooperate in a complimentary fashion. Therefore, a person of ordinary skill in the art may consider various other alignment patterns that allow cooperating disks to maintain the axial and radial gaps described above.

With reference to FIGS. 14-17, a second exemplary embodiment of a disk 160 to be used in the harvester 22 is illustrated. The disk 160 can be used in the roller assembly 38 and any embodiment of the harvester 22 described above. The disk 160 has a non-circular unitary body 162 with a hole 164 extending through the body 162. The body 162 can have a first segment 168, a second segment 186, and a third segment 210.

The first segment 168 of the body 162 has a first outside perimeter 170. The first outside perimeter 170 has a plurality of disk sides. For example, the first outside perimeter 170 has a first side 178, a second side 180, and a third side 182. The sides meet at apexes 184 of the first outside perimeter 170. As illustrated in FIG. 15, the first segment 168 of the body 162 has a first segment thickness 172. The first segment 168 further has a first face 174 and a second face 176.

The second segment 186 of the body 162 is adjacent to the first segment 168 on the first face 174 or second face 176. In the exemplary embodiment of FIGS. 14-17, the second segment 186 is adjacent to the first segment 168 on the first face 174 of the first segment 168. The second segment 186 has a second outside perimeter 188. The second outside perimeter 188 has a plurality of disk sides, including a first side 192, a second side 194, and a third side 196. The sides meet at apexes 198 of the second outside perimeter 188.

The second segment 186 has a second segment thickness 90 that is greater than the first segment thickness 172. In an exemplary embodiment, the second segment thickness 190 can be approximately twice as thick as the first segment thickness 172. In alternative embodiments, the second segment thickness 190 may be greater than twice as thick as the first segment thickness 172, or less than twice as thick as the first segment thickness 172. The first and second segment thicknesses 172, 190 impact the size of the gap between disks. Therefore, the thicknesses may be any suitable thickness depending on the crop product or other material to be separated from debris. Since gaps between disks must be smaller than the crop product or other material to be separated from the debris, the relative thicknesses of the first segment and second segments may be different for different crop products.

The second outside perimeter 188 of the disk 160 is a first hollow projection 224 that has a cavity 226. The second segment 186 further includes a second hollow projection 228 in the shape of the perimeter of the hole 164. Together, the first and second hollow projections 224, 228 make up the second segment 186 of the body 162.

The third segment 210 of the disk 160 is positioned adjacent to the first segment 168 on the face of the first segment 168 that is opposite to the second segment 186. In the embodiment of FIGS. 14-17, the third segment 210 is adjacent to the second face 176 of the first segment 168. The third segment 210 has a third outside perimeter 212 with a first side 216, a second side 218, and a third side 220. The sides meet at apexes 222.

The third segment 210 is a third hollow projection 230 that is configured to nest within the cavity 226 of the second segment 186 of an adjacent disk. The third segment 210 has a third segment thickness 214 as illustrated in FIG. 15. The third segment thickness 214 is less than the second segment thickness 190. Little to no portion of the third segment 210 is exposed when adjacent disks are axially mounted. In this manner, the spacing between adjacent disks 160 mounted along the same shaft and cooperating disks 160 mounted on a parallel shaft is the same as described in conjunction with the first embodiment of the disk 60.

In the exemplary embodiment of FIGS. 14-17, the shapes of the first outside perimeter 170 and the second outside perimeter 188 are the same as the disk 60 illustrated in FIGS. 4-7.

The third hollow projection 230 interlocks with the cavity 226 of an adjacent disk in only one orientation. For example, the third hollow projection 230 is oriented with its apexes 222 offset from the apexes 184 of the first segment 168 and the apexes 198 of the second segment 186 by, for example, approximately thirty degrees. When the third hollow projection 230 of the disk 160 interlocks with a cavity 226 of an adjacent disk 160, the adjacent disk 160 is offset by the same degree of offset between the apexes 222 of the third hollow projection 230 and the apexes 184 of the first segment 168. Thus, the offset of the apexes 222 of the third hollow projection 230 compared to the apexes 184 of the first segment 168 determines the degree of offset between the apexes 184 of adjacent disks. When the apexes 222 of the third hollow projection 230 are rotated by thirty degrees as compared to the apexes 184 of the first segment 168, the disk 160 will interlock or nest with an adjacent disk 160 such that the apexes 184 of adjacent disks are offset by thirty degrees. Other embodiments can have different offsets, for example, approximately forty-five degrees. The disk 160 is used in a roller assembly configuration where adjacent disks are offset from each other, for example as described in FIGS. 8-12 and roller assembly 38.

With reference to FIGS. 18-21, a third exemplary embodiment of a disk 260 to be used in the harvester 22 is illustrated. The disk 260 is similar to the disk 160 except that a third hollow projection 330 has apexes 322 that are aligned with apexes 284 of a first segment 268 and apexes 298 of a second segment 286. Thus, the disk 260 interlocks with a cavity 326 of an adjacent disk 260 such that the apexes 284 of adjacent disks are aligned. The first segment 268 has a first segment thickness 272. The second segment 286 has a second segment thickness 290 that is greater than the first segment thickness 272. A third segment 310 has a third segment thickness 314 less than the second segment thickness 290. The disk 260 is used in a roller assembly configuration where adjacent disks are aligned, for example as described in FIG. 13 and roller assembly 138.

The disks 60, 160, 260 described herein can be connected to adjacent disks on the same rotational shaft by means any suitable means. For example, adjacent disks can be connected by set screws, adhesives, nut and bold assemblies, interference fits, or other suitable means. The disks 60, 160, 260 may also be mounted along a rotational shaft in a manner that does not require being connected to adjacent disks. For example, adjacent disks may all be mounted up against each other such that no space exists between adjacent disks. In this embodiment, end collars 54, 154 can be mounted on each end of the rotational shaft to prevent the disks 60, 160, 260 from moving apart from each other over time. For the second and third embodiments of the disk 160, 260, the means described above can be used separately from or in conjunction with interlocking or nesting.

The disks 60, 160, 260 may be constructed from any suitable material known in the art, for example Acetal made by the Dupont Company under the trade name Delrin®. The disks 60, 160, 260 may alternatively be constructed from various other metals, alloys, plastics, and rigid rubbers known in the art. However, materials that can bend or flex tend to jam more frequently than harder materials. Hard, rigid disks tend to decrease the likelihood of jamming. Therefore, it is generally preferable to form the disks 60, 160, 260 from a harder material, though the choice of material may change according to the desired application and a balancing of strength, durability, and propensity to jam.

In an exemplary embodiment where the disks 60, 160, 260 are formed of Acetal made by the Dupont Company under the trade name Delrin®, the disks may be injection molded according to methods known in the art. The injection molding process may utilize techniques known to injection molders to mitigate undesirable warping during cooling, and to maintain structural integrity. For example, ridges or projections can be added along a flat surface that may be susceptible to warping, as shown in the disk 160 of FIGS. 14-17 and the disk 260 of FIGS. 18-21. Furthermore, ridges or projections may be added on opposite faces of the disk 160, 260 to maintain balance. However, such techniques should not alter the operation of the roller assembly or the gaps between disks.

While the present disclosure refers to a first rotational shaft 50, 150 and a second rotational shaft 52, 152, it is understood that the roller assembly 38, 138 is not constrained to having two rotational shafts and can have any additional number of rotational shafts.

A method for removing dirt and debris from harvested crop product, for example tree nuts, comprises providing the roller assembly 38, 138 according to any of the embodiments described above, simultaneously rotating the first and second rotational shafts, and allowing dirt and debris to fall through spacing between the disks of the roller assembly 38, 138.

The roller assembly 38, 138 can include a first rotational shaft 50, 150 mounted to a roller assembly frame 48, 148, wherein the first rotational shaft 50, 150 coincides with a first rotational axis 56, 156 and includes a plurality of disks 60, 160 axially mounted thereon. A second rotational shaft 52, 152 is mounted to the roller assembly frame 48, 148 parallel to the first rotational shaft 50, 150, wherein the second rotational shaft 52, 152 coincides with a second rotational axis 58, 158 and includes a plurality of disks 60, 160 axially mounted thereon. The disks 60, 160, 260 can be any embodiment as described herein.

The apparatus and methods of the present disclosure offer improvements in crop product harvesting by more cleanly separating harvested crop product from dirt, dust, and debris. The ability to separate the crop product from dirt, dust, and debris in such a clean manner reduces the need to operate a fan assembly. For example, in dry or sandy conditions, the apparatuses and methods described herein can cleanly separate the crop product from dirt, dust, and debris without operating a fan assembly at all, thus greatly reducing dust generation. The apparatuses and methods of the present disclosure also are less prone to jamming and binding up, resulting in less down time and less stress being placed on components that can, over time, result in premature failure.

The above description and drawings are only illustrative of preferred embodiments, and are not intended to be limiting. For example, the illustrated embodiments include a disk with two segments, which may be different sizes. Other embodiments may instead include two disks of single segments, which may be different sizes. Any subject matter or modification thereof which comes within the spirit and scope of the following claims is to be considered part of the present inventions.

What is claimed as new and desired to be protected by Letters Patent of the United States is:

1. A nut harvester, comprising:
   a power take off;
   a fan assembly;
   a hydraulic pump;
   a hydraulic motor;
   a crop product collection mechanism;
   an exit conveyor;
   a mechanical connection between the hydraulic motor and a roller assembly; and
   the roller assembly including:
      a first rotational shaft mounted to a frame, wherein the first rotational shaft coincides with a first rotational axis and includes a plurality of disks axially mounted thereon;
      a second rotational shaft mounted to the frame parallel to the first rotational shaft, wherein the second rotational shaft coincides with a second rotational axis and includes a plurality of disks axially mounted thereon; and
      the plurality of disks, each including:
         a non-circular body;
         a hole extending through the body and defining a first rotational axis;
         a first segment of the body including a first outside perimeter and a first segment thickness; and
         a second segment of the body adjacent to a first face of the first segment, the second segment including a second outside perimeter smaller than the first outside perimeter and a second segment thickness greater than the first segment thickness;
      wherein:
         the plurality of disks are configured to cooperate with disks mounted adjacent along the first rotational shaft and disks mounted along the second rotational shaft, whereby a first axial gap and a second axial gap between cooperating adjacent disks along the first rotational shaft combine to equal the second segment thickness minus the first segment thickness, and a radial gap is defined by a distance between the first outside perimeter of disks mounted along the first rotational shaft and the second outside perimeter of cooperating disks mounted along the second rotational shaft; and
         wherein the first axial gap, second axial gap, and radial gap are effectively constant during rotation of the first and second rotational shafts for uniform separation of crop product from debris.

2. The nut harvester of claim 1, wherein the first and second rotational shafts are separated by a radial spacing distance.

3. The nut harvester of claim 2, wherein the radial spacing distance is adjustable when the nut harvester is not operating.

4. The nut harvester of claim 2, further comprising an axial spacing distance between adjacent disks mounted along a rotational shaft, wherein the first axial gap and the second axial gap combine to equal the axial spacing distance plus the second segment thickness minus the first segment thickness.

5. The nut harvester of claim 2, wherein a perimeter of the hole has a plurality of hole sides and the first and second outside perimeters have a plurality of disk sides, the number of disk sides being different than the number of hole sides.

6. The nut harvester of claim 5, wherein the perimeter of the hole has four hole sides, and the first and second outside perimeters have three disk sides.

7. A nut harvester, comprising:
   a power take off;
   a fan assembly;
   a hydraulic pump;
   a hydraulic motor;
   a crop product collection mechanism;
   an exit conveyor;
   a mechanical connection between the hydraulic motor and a roller assembly; and
   the roller assembly including:
      a first rotational shaft mounted to a frame, wherein the first rotational shaft coincides with a first rotational axis and includes a plurality of disks axially mounted thereon;
      a second rotational shaft mounted to the frame parallel to the first rotational shaft, wherein the second rotational shaft coincides with a second rotational axis and includes a plurality of disks axially mounted thereon; and
      the plurality of disks, each including:
         a non-circular unitary body;
         a hole extending through the body and defining a first rotational axis;
         a first segment of the body including a first outside perimeter and a first segment thickness; and
         a second segment of the body adjacent to a first face of the first segment, the second segment including a second outside perimeter smaller than the first outside perimeter and a second segment thickness greater than the first segment thickness;
      wherein:
         the plurality of disks are configured to cooperate with disks mounted adjacent along the first rotational shaft and disks mounted along the second rotational shaft, whereby a first axial gap and a second axial gap between cooperating adjacent disks along the first rotational shaft combine to equal the second segment thickness minus the first segment thickness, and a radial gap is defined by a distance between the first outside perimeter of disks mounted along the first rotational shaft and the second outside perimeter of cooperating disks mounted along the second rotational shaft, the first and second rotational shafts are separated by a radial spacing distance, a perimeter of the hole has four hole sides and the first and second outside perimeters have three disk sides, and the first outside perimeter has three apexes connected by three arcs and the second outside perimeter has three apexes connected by three arcs, wherein the arcs have a same radius that is based on a radius of a circle and the apexes of the first outside perimeter align with apexes of the second outside perimeter.

8. The nut harvester of claim 7, wherein each of the plurality of disks further includes a third segment of the body adjacent to a second face of first segment of the body, the third segment including:

a third outside perimeter smaller than the second outside perimeter; and a third segment thickness less than the second segment thickness.

9. The nut harvester of claim 8, wherein the second outside perimeter is a first hollow projection having a cavity and the second segment further includes a second hollow projection in a shape of the perimeter of the hole, and the third outside perimeter is a third hollow projection configured to interlock with the cavity of the second segment of an adjacent disk.

10. The nut harvester of claim 9, wherein apexes of the third outside perimeter are offset from the apexes of the first and second outside perimeters such that each disk is configured to mate with an adjacent disk and the apexes of the first outside perimeter of the disk are rotationally oriented at different angles compared to apexes of a first outside perimeter of the adjacent disk.

11. The nut harvester of claim 9, wherein apexes of the third outside perimeter align with the apexes of the first and second outside perimeters such that each disk is configured to mate with an adjacent disk and the apexes of the first outside perimeter of the disk are aligned with apexes of a first outside perimeter of the adjacent disk.

12. The nut harvester of claim 1, wherein the first segment thickness is about half of the second segment thickness.

13. The nut harvester of claim 12, wherein an aspect ratio between the first disk segment and the second disk segment is about three to two.

14. The nut harvester according to claim 1, wherein the non-circular body is unitary.

15. The nut harvester according to claim 1, wherein the first and second perimeters are polygons having arcs, and a radius of the arcs is calculated by the formula:

$$0 = -\sqrt{R^2 - \left(\frac{S_L}{2}\right)^2} + (\cos(\theta) - 1)\left(\frac{S_L - S_S}{2\sin(\theta)}\right) + \sqrt{R^2 - \left(\frac{S_S}{2}\right)^2},$$

wherein R is the radius, $S_L$ is a length of a side of the first outside perimeter, $S_S$ is a length of a side of the second outside perimeter, and $\theta$ is a degree of an angle of a bisected, included angle of the polygons that is calculated by dividing 180 degrees by the number of sides of the polygons.

\* \* \* \* \*